(12) United States Patent
Kato

(10) Patent No.: US 8,078,043 B2
(45) Date of Patent: Dec. 13, 2011

(54) IMAGE SHAKE CORRECTION APPARATUS AND IMAGE PICKUP APPARATUS

(75) Inventor: Yuichiro Kato, Utsunomiya (JP)

(73) Assignee: Canon Kabushiki Kaisha (JP)

( * ) Notice: Subject to any disclaimer, the term of this patent is extended or adjusted under 35 U.S.C. 154(b) by 0 days.

(21) Appl. No.: 12/755,586

(22) Filed: Apr. 7, 2010

(65) Prior Publication Data

US 2010/0260493 A1   Oct. 14, 2010

(30) Foreign Application Priority Data

Apr. 13, 2009   (JP) .................................. 2009-097065

(51) Int. Cl.
*G03B 17/00*   (2006.01)
*H04N 5/228*   (2006.01)
*G02B 27/64*   (2006.01)

(52) U.S. Cl. ...................... 396/55; 348/208.11; 359/557

(58) Field of Classification Search ..................... 396/55, 396/52; 348/208.4, 208.7, 208.11; 359/554, 359/557
See application file for complete search history.

(56) References Cited

U.S. PATENT DOCUMENTS

2009/0060485 A1 * 3/2009 Takahashi ....................... 396/55

FOREIGN PATENT DOCUMENTS

| JP | 2641172 B2 | 8/1997 |
| JP | 2006-243704 A | 9/2006 |

* cited by examiner

*Primary Examiner* — Rochelle-Ann J Blackman
(74) *Attorney, Agent, or Firm* — Rossi, Kimms & McDowell LLP

(57) ABSTRACT

A third group barrel 3 holding a third lens group L3 is controlled to be driven by drivers in yaw and pitch directions orthogonal to an optical axis, respectively. The Y magnet and the Y yoke of the driver in the yaw direction are fixed on the third group barrel 3, and a Y electromagnetic coil is disposed at a Y guide base 24 surrounding the third group barrel 3. As a driver in the pitch direction, a P magnet and P yoke 29 are fixed to the Y guide base 24, and a P electromagnetic coil is fixed to a P guide base at an opposed position. A Y guide bar 25 and a P guide bar 30 are overlapped with projection regions onto planes orthogonal to the optical axis of the Y electromagnetic coil and the Y magnet, and the P electromagnetic coil and the P magnet, respectively.

2 Claims, 8 Drawing Sheets

IMAGE SHAKE CORRECTION APPARATUS AND IMAGE PICKUP APPARATUS

BACKGROUND OF THE INVENTION

1. Field of the Invention

The present invention relates to an image shake correction apparatus of an optical device such as an image pickup apparatus, for example a video camera or a digital still camera, or an interchangeable lens apparatus.

2. Description of the Related Art

A conventional image shake correction apparatus is disclosed in Japanese Patent No. 2641172. The apparatus moves an image shake correction optical system that is a part of an image pickup optical system in two directions on a plane substantially orthogonal to an optical axis to change the optical axis of the image pickup optical system in order to correct the image shake which is generated by the shake of a camera when taking an image.

As a structure of such an image shake correction apparatus, commonly, two driving sources are provided for driving the image shake correction lens in two directions orthogonal to the optical axis and the driving sources are disposed at two positions around the lens, respectively.

As disclosed in Japanese Patent Laid-open No. 2006-243704, a conventional art commonly has a configuration where a longitudinal direction of an electromagnetic coil of an actuator is disposed so as to be in an optical axis direction, and a correction optical system is driven by two sliders and two guide bars in pitch and yaw directions. In any way, a guide and rotational limit mechanism with respect to a drive direction of the optical system is disposed on a movable plane of the correction optical system.

However, in the conventional configuration, since parts such as a magnet, an electromagnetic coil, or an FPC which are necessary for driving the lens are disposed outside the image shake correction lens, an image shake correction apparatus and an image pickup apparatus having the image shake correction apparatus are enlarged in a diameter direction. Further, an error component is increased by adding parts such as a slider and therefore the accuracy and the workability may be deteriorated in moving the correction optical system to a desired position.

BRIEF SUMMARY OF THE INVENTION

The present invention provides an image shake correction apparatus which is reduced in size and improves the assemble productivity while maintaining accuracy and workability, and an image pickup apparatus having the image shake correction apparatus.

A lens barrel as one aspect of the present invention comprises a lens holding member, a fixing member configured to perform a positioning of the lens holding member in an optical axis direction, a driving member including a coil and a magnet, and a guide section configured to guide the lens holding member which is driven by an electromagnetic force acting between the coil and the magnet in a plane orthogonal to the optical axis. The guide section is disposed so as to be overlapped with at least one of the coil and the magnet when viewed in the optical axis direction.

An image pickup apparatus as another aspect of the present invention comprises a lens barrel, and a camera including an image pickup element. The lens barrel comprises a lens holding member, a fixing member configured to perform a positioning of the lens holding member in an optical axis direction, a driving member including a coil and a magnet, and a guide section configured to guide the lens holding member which is driven by an electromagnetic force acting between the coil and the magnet in a plane orthogonal to the optical axis. The guide section is disposed so as to be overlapped with at least one of the coil and the magnet when viewed in the optical axis direction.

Further features and aspects of the present invention will become apparent from the following description of exemplary embodiments with reference to the attached drawings.

DETAILED DESCRIPTION OF THE PREFERRED EMBODIMENTS

Exemplary embodiments of the present invention will be described below with reference to the accompanied drawings.

Figure 1:
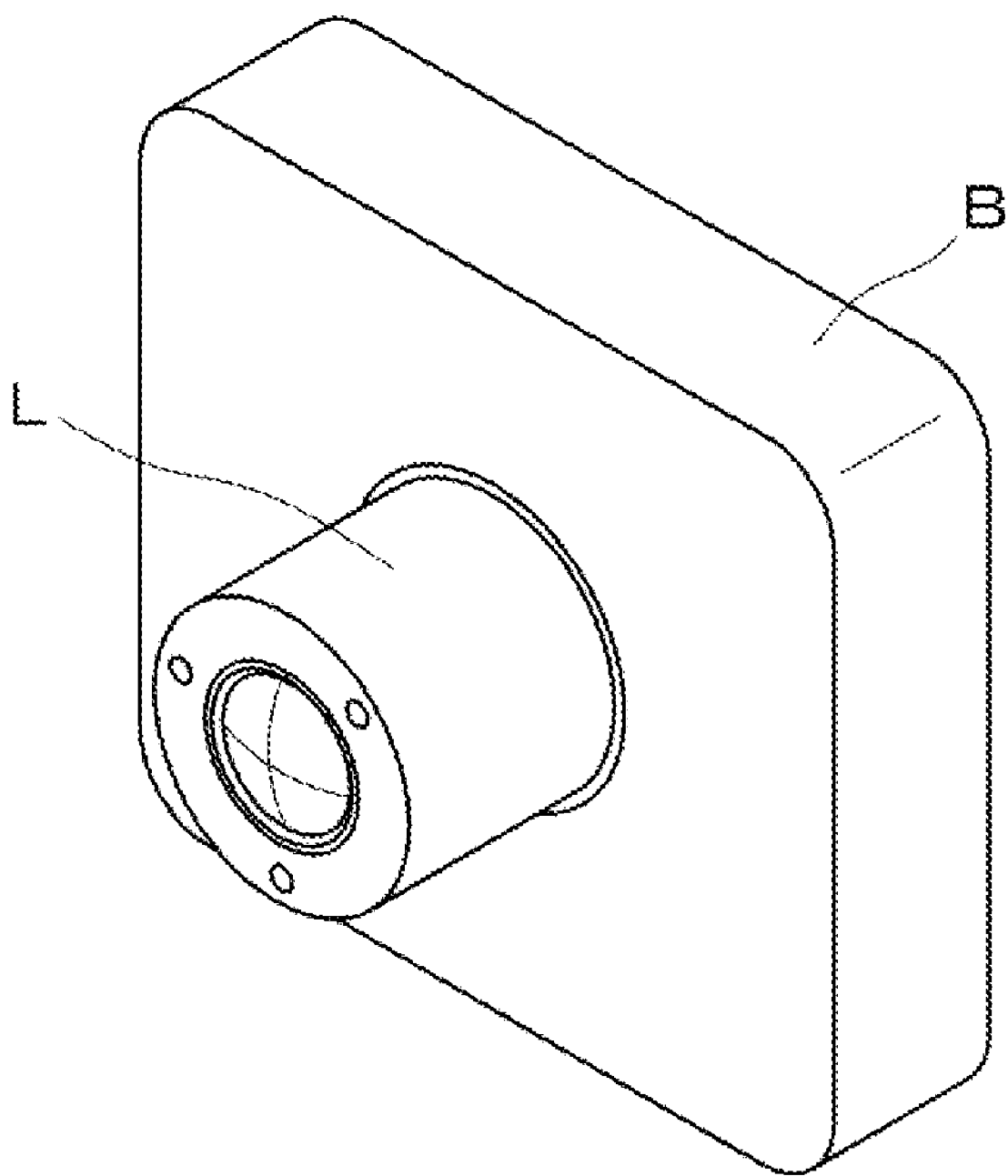
FIG. 1 is a perspective view of a camera of the embodiment.

FIG. 1 shows a perspective view of an image pickup apparatus such as a video camera or a digital camera (hereinafter, referred to as a camera) of the embodiment. A lens barrel L capable of zooming is attached to the front of a camera body B, and a silver salt film or an image pickup element for recording an object image formed by an image pickup optical system in the lens barrel L is housed in the camera body B.

Figure 2:
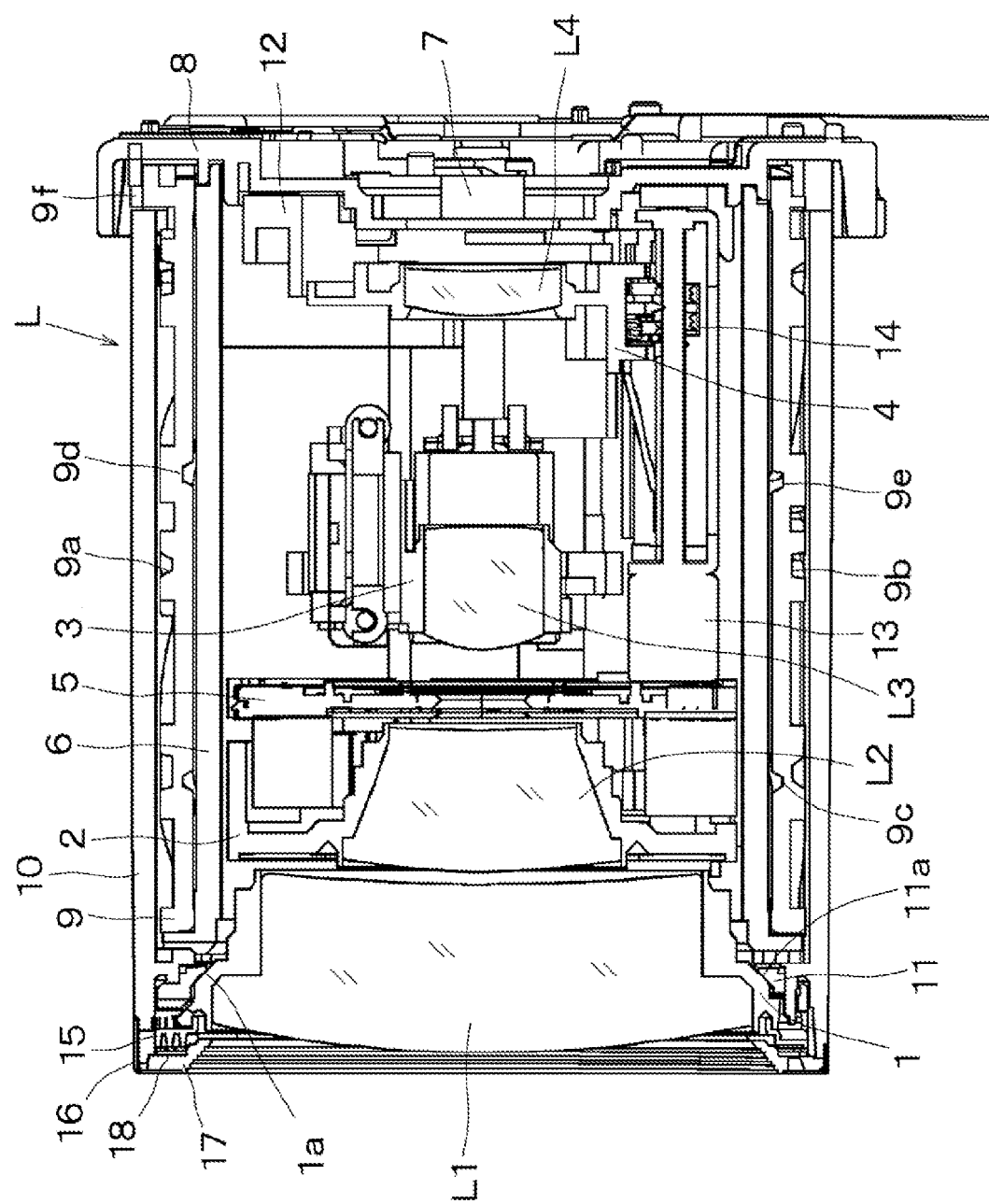
FIG. 2 is a cross-sectional view of a lens barrel.
Figure 3:
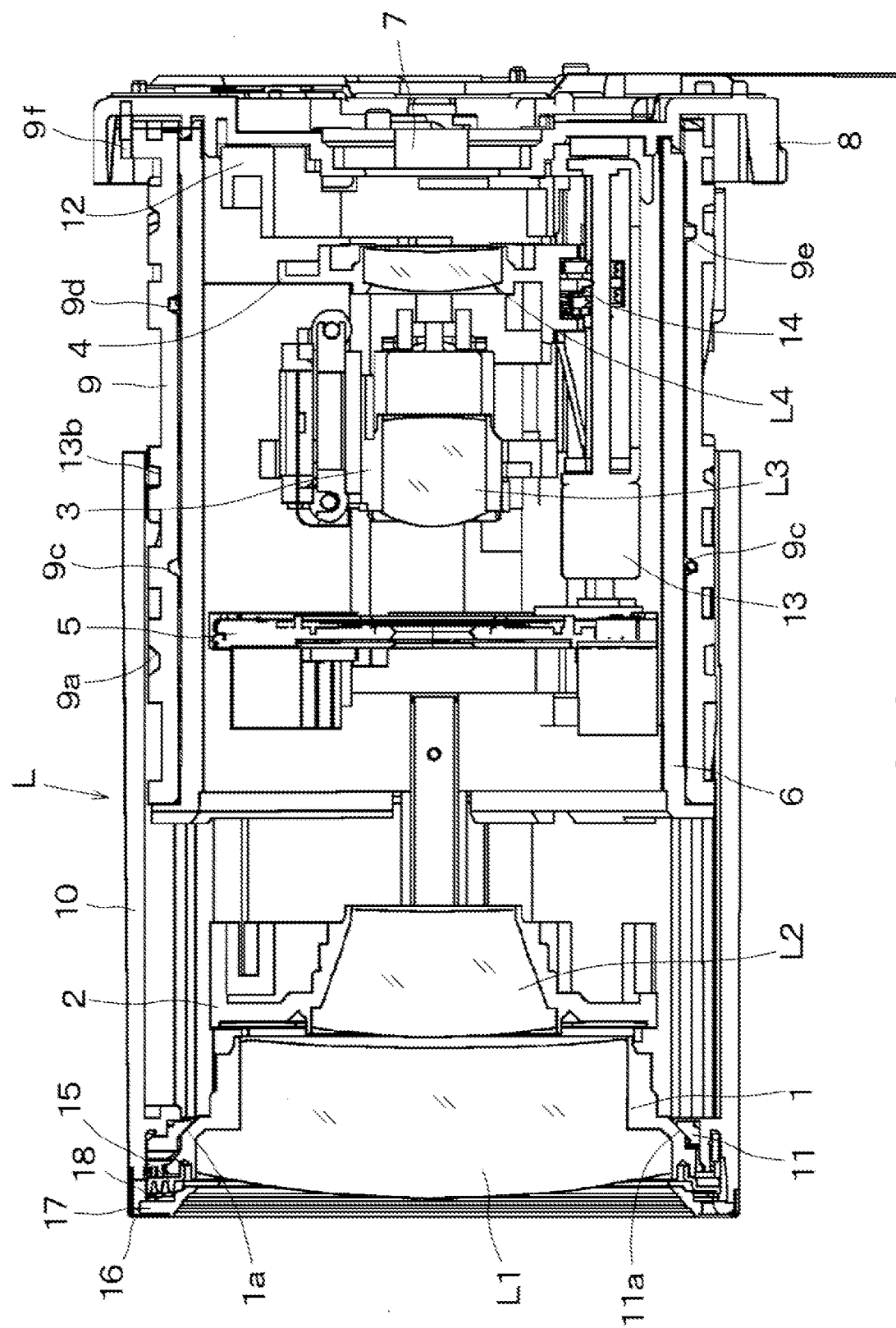
FIG. 3 is a cross-sectional view of a lens barrel in a wide-angle condition.
Figure 4:
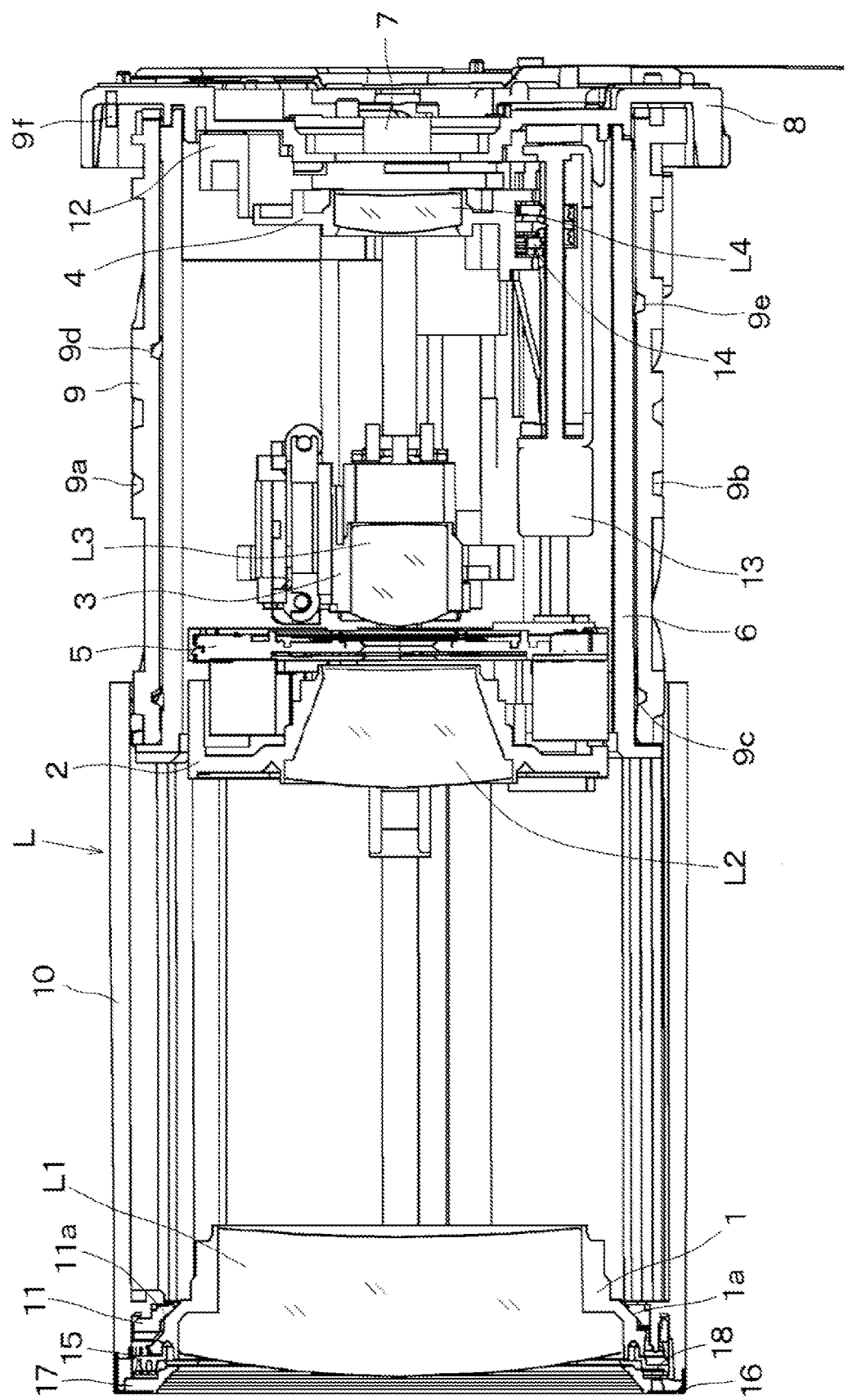
FIG. 4 is a cross-sectional view of a lens barrel in a telephoto condition.

FIGS. 2 to 4 are cross-sectional views of the lens barrel L. The lens barrel L has a magnification varying optical system configured by four groups and is a so-called retractable lens barrel where the interval of each lens group is narrowed in a non-use state relative to the interval during a normal use to considerably shorten a total lens length. FIG. 2 is a cross-sectional view of a main part of the lens barrel in a retracted condition, FIG. 3 is a cross-sectional view in the widest angle condition, and FIG. 4 is a cross-sectional view at the most telephoto condition.

A first lens group L1, a second lens group L2, a third lens group L3 that is a correction optical system which moves in a plane perpendicular to an optical axis to perform a shake correcting operation, and a fourth lens group L4 which moves in an optical axis direction to perform an in-focus operation are arranged in the optical axis direction.

The first lens group L1 is held by a first group barrel 1, and the second lens group L2 is held by a second group barrel 2, and the third lens group L3 is held by a third group barrel 3 constituting a shift unit so as to be capable of moving in the plane orthogonal to the optical axis. The fourth lens group L4 is held by a fourth group barrel 4, and an aperture shutter unit 5 which adjusts a light intensity is provided between the second lens group L2 and the third lens group L3. The first barrel 1 is positioned at a front end of a fixing tube 6, the second barrel 2, third barrel 3, and fourth barrel 4 are housed in the fixing tube 6, and a rear barrel 8 to which an image pickup element 7 such as a CCD is attached is fixed at a rear end of the fixing tube 6.

A cam tube 9 whose position is limited by the rear barrel 8 and the fixing tube 6 is held so as to be rotatable on the outer circumference of the fixing barrel 6. The cam tube 9 is arranged so that a first group tube 10 is freely slidable on the outer circumference in a forward and backward direction, and the first barrel 1 is fit into a cam roller provided on the first group tube 10 via a tracking ring 11 so that the first lens group L1 can be driven in the optical axis direction. A driver for rotating the cam tube 9 is a zoom motor (not shown) fixed on the rear barrel 8, and it engages with a gear 9*f* provided at a rear end of the cam tube 9 and rotates the cam tube 9 to perform a magnification varying operation.

The cam tube 9 is provided with a first group cam groove 9*a* for a driving, a shock cam groove 9*b* for receiving a shock, a second group cam groove 9*c* for driving the second lens group L2, a third group cam groove 9*d* which drives the third lens group L3, and an aperture shutter cam groove 9*e* which drives the aperture shutter unit 5. A cam follower pin integrally provided on each moving lens group described below is fit into the cam tube 9 and the cam tube 9 rotates around an outside diameter of the fixing tube 6 that is a shaft. The cam tube 9 is configured to move the first to third lens groups L1 to L3 that are moving lens groups and the aperture shutter unit 5 via the cam follower pin backward and forward in the optical axis direction to perform the magnification varying operation and to retract the whole of the lens barrel L.

A support frame 12 which supports the fourth group barrel 4 is fixed on the rear barrel 8 by a screw, and the fours lens group L4 is moved in the optical axis direction to perform an in-focus operation. A focus motor 13 is fixed on the support frame 12, and a lead screw having the same axis as that of a rotor of the focus motor 13 engages with a rack 14 which is attached to the fourth group barrel 4 to move the fourth lens group L4 by the rotation of the rotor. Each backlash of the fourth group barrel 4, a guide bar (not shown), the rack 14, and the lead screw is pulled to one side by a return coil spring (not shown).

When the position detection of the fourth group barrel 4 is performed, the switching of the shield and the transmission caused by the movement of the shielding portion formed on the fourth group barrel 4 in the optical axis direction is electrically detected by using a photo interrupter (not shown) to detect a reference position of the fourth lens group L4. A reset switch of zooming is electrically configured to detect the switching of the shield and the transmission caused by the movement of the shielding portion at a rear end of the cam tube 9 in a rotational direction by using a photo interrupter (not shown) to detect a plurality of reference positions of the cam tube 9.

The first lens group L1 performs a so-called one-side blur correcting adjustment which makes an optical back projection performance uniform from right to left and up and down along with the first group barrel 1, and a so-called tracking adjustment which adjusts a position in the optical axis direction where the fourth lens group L4 is in focus. The one-side blur correcting adjustment is performed by a so-called falling adjustment which obtains a desired optical performance by falling the first group barrel 1 along a surface of a spherical surface 1*a* formed on the first group barrel 1 on a taper surface 11*a* provided on the tracking ring 11 which contacts the first group tube 10.

The tracking adjustment is performed by selecting the tracking ring 11 by rotating it on a tilted surface or a plurality of discontinuous surfaces (not shown) provided on the first group tube 10 and by moving the tracking ring 11 and the first group barrel 1 in the optical axis direction. When a desired optical performance is confirmed after these adjustments, the first barrel 1 and the tracking ring 11 and the first group tube 10 are adhesively fixed.

In the present embodiment, the so-called one-side blur correcting adjustment is performed by the falling adjustment, but the one-side blur correcting adjustment can also be performed by a so-called eccentric adjustment by which the optical axis of the first group barrel 1 is displaced to a center on a predetermined surface in accordance with the optical property.

After these adjustments are performed, a dust-proof rubber 15 which prevents the intrusion of dusts into the lens barrel L is assembled. Then, a front mask 17 that is base for assembling a dressing ring 16 is assembled along with a front mask plate 18. The assembling of the front mask 17 is performed by a bayonet structure of three parts where a flange portion (not shown) provided on the first group tube 10 and a flange portion (not shown) provided on the front mask 17 are hooked by the front mask plate 18.

Figure 5:
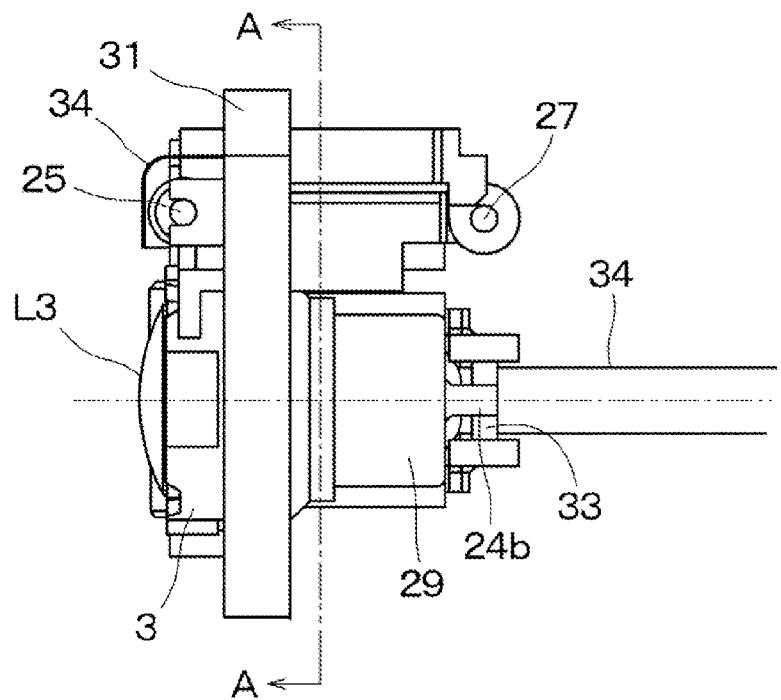
FIG. 5 is a side view of a shift unit.
Figure 6:
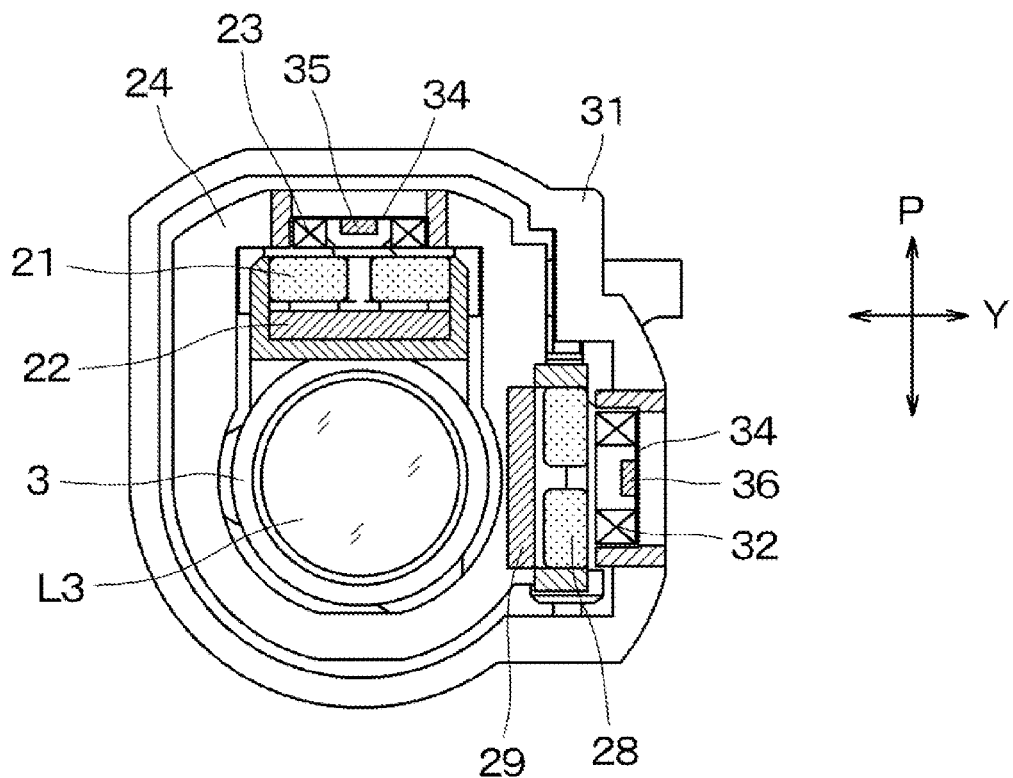
FIG. 6 is a cross-sectional view along A-A line of FIG. 5.
Figure 7A:
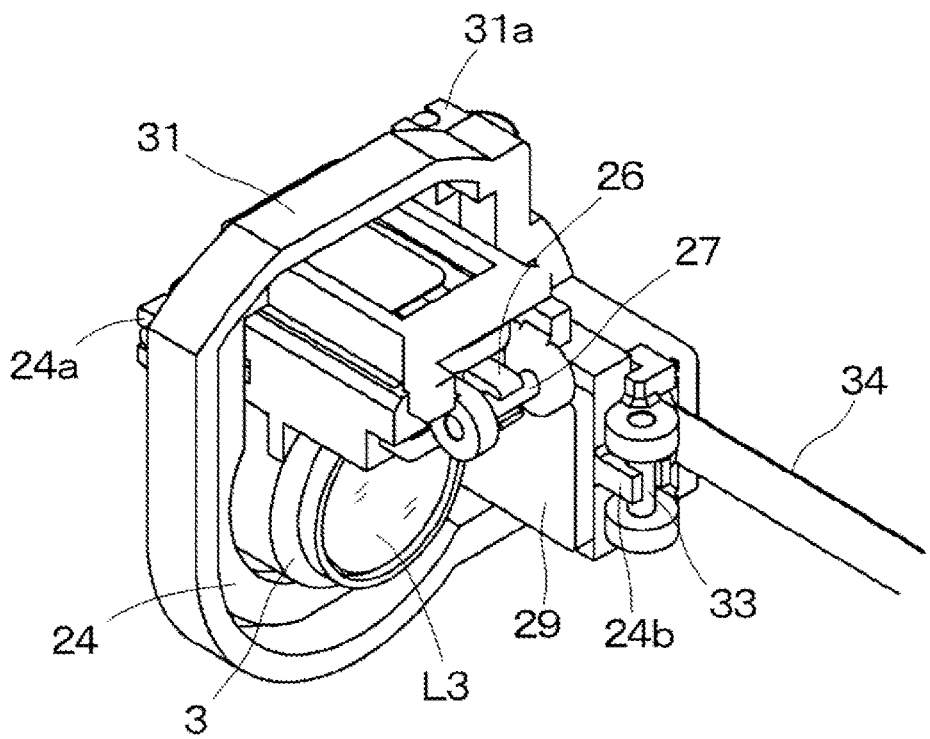
FIGS. 7A and 7B are perspective views of a shift unit when viewed in two directions respectively.
Figure 7B:
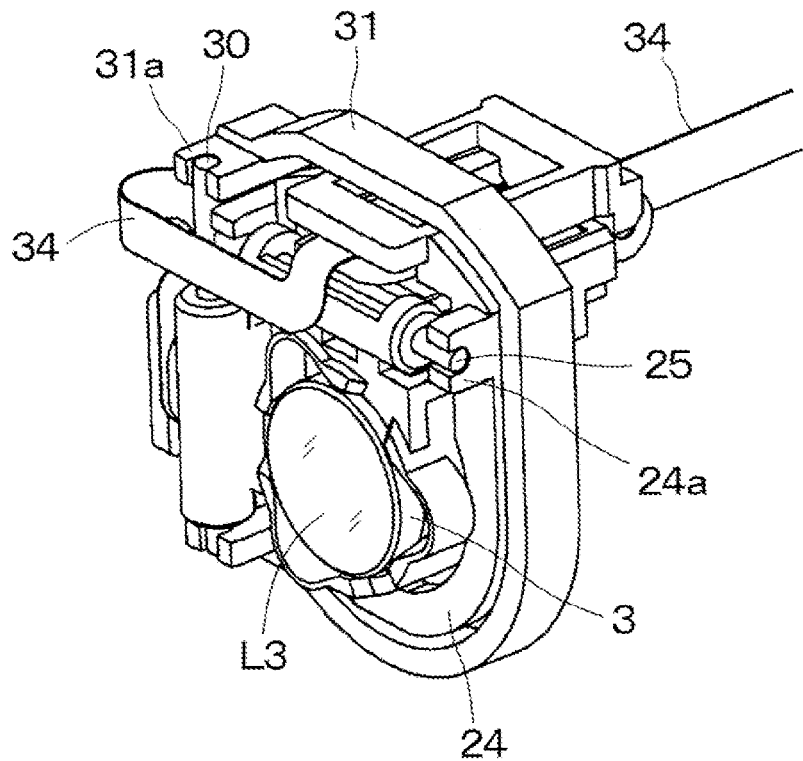
Figure 8:
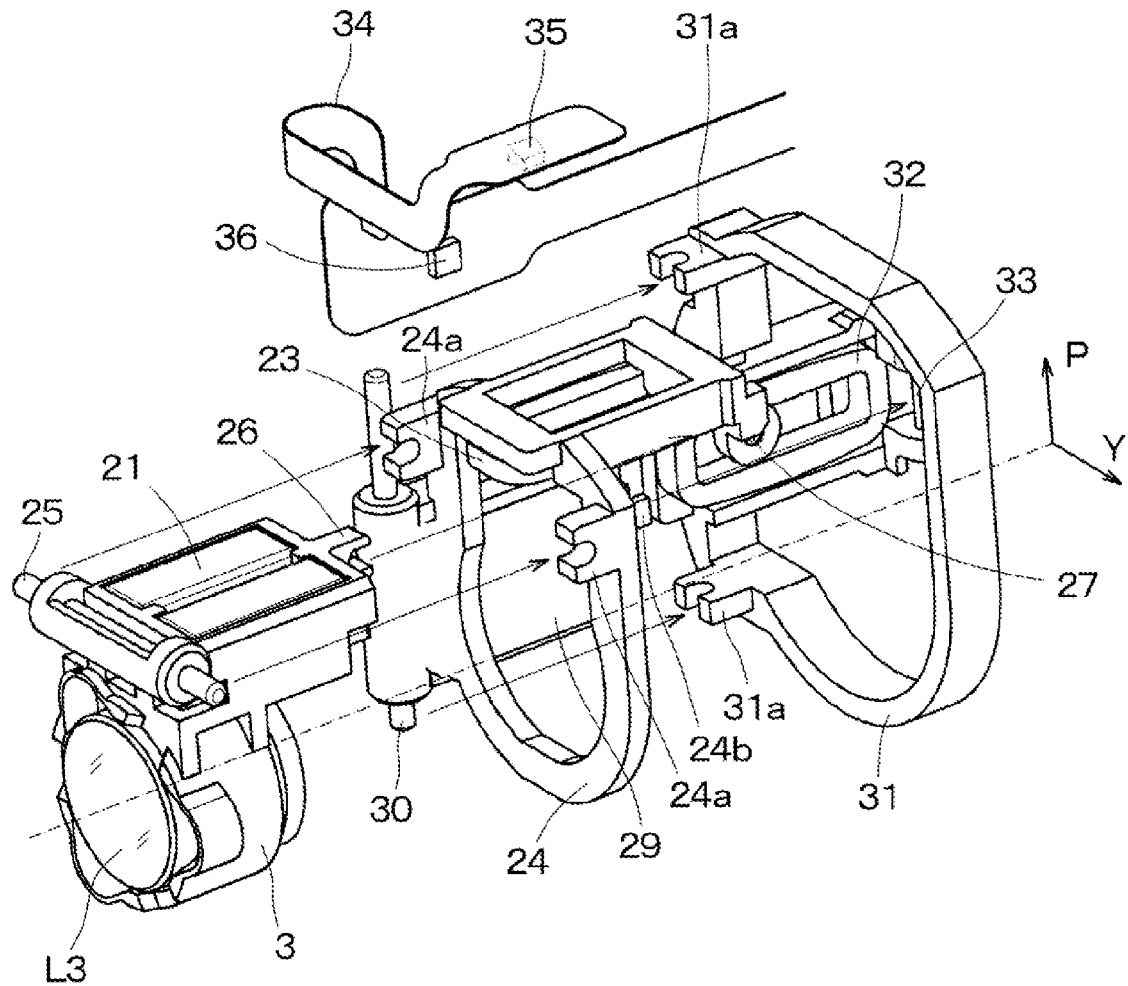
FIG. 8 is an exploded perspective view of a shift unit.

FIG. 5 is a side view of a shift unit, FIG. 6 is a cross-sectional view along A-A line of FIG. 5, FIGS. 7A and 7B are perspective views when viewed in two directions respectively, and FIG. 8 is an exploded perspective view. A third lens group L3 is controlled so as to be independently driven in a direction orthogonal to the optical axis by respective drivers and position detectors in a longitudinal direction for correcting an image shake in a pitch direction P (an angle change in the longitudinal direction) and in a lateral direction for correcting an image shake in a yaw direction Y (an angle change in the lateral direction).

A Y magnet 21 and a Y yoke 22 as a driver in a yaw direction are adhesively fixed to the third group barrel 3 that is a holding frame of the third lens group L3, and a Y electromagnetic coil 23 is disposed outside the Y magnet 21 and the Y yoke 22 and is adhesively fixed to a Y guide base 24 surrounding the three group barrel 3. Further, a Y guide bar 25 that is a guide section penetrates a sleeve portion provided on the third group barrel 3 in the yaw direction, and both ends of the Y guide bars 25 are fixed on a U-shaped groove portion 24*a* of the Y guide base 24 so as to be configured to guide the third group barrel 3 in the yaw direction.

A rotational limit around the Y guide bar 25 of the third group barrel 3 is performed by fitting a YU bar 27 that is a guide section fixed on the Y guide base 24 into a U-shaped groove portion 26 provided on the third group barrel 3. The third group barrel 3 can be moved in the yaw direction along the Y guide bar 25 and the YU bar 27.

Further, a P magnet 28 and a P yoke 29 that are a driver in a pitch direction are fixed at a position of the Y guide base 24 whose direction is different by 90 degrees from that of the Y electromagnetic coil 23, and a P guide bar 30 penetrates a sleeve portion provided on the Y guide base 24 in the pitch direction. Both ends of the P guide bar 30 are fixed on a U-shaped groove portion 31*a* of a P guide base 31 surrounding the Y guide base 24 so as to guide the Y guide base 24 in the pitch direction. A P electromagnetic coil 32 is fixed at a position opposed to the P magnet 28 in the P guide base 31.

A rotational limit of the Y guide base 24 around the P guide bar 30 is performed by fitting a PU bar 33 fixed on the P guide base 31 into a U-shaped groove portion 24*b* provided on the Y guide base 24. The Y guide base 24 and the third group barrel 3 disposed inside it are movable in the pitch direction along the P guide bar 30 and the PU bar 33.

The U-shaped groove portion 31*a* of the P guide base 31, the U-shaped groove portion 24*b* of the Y guide base 24, the U-shaped groove portion 24a, and the U-shaped groove portion 26 of the third group barrel 3 have U shapes that open at sides of the first lens group L1, the fourth lens group L4, the first lens group L1, and the fourth lens group L4, respectively. Accordingly, the Y guide base 24 with respect to the P guide base 31, each of the guide bars and the U bars of the third group barrel 3 with respect to the Y guide base 24 can be assembled so as to be stacked from a side of the first lens group L1.

With respect to the sleeve of the Y guide base 24, the U-shaped groove portion 24b is disposed at a position opposed to the P magnet 28 and the P yoke 29 in a longitudinal direction. In addition, with respect to a sleeve of the third group barrel 3, the U-shaped groove portion 26 is disposed at a position opposed to the Y magnet 21 and the Y yoke 22 in a longitudinal direction. Thus, a necessary distance between the sleeve and the U-shaped portion is provided to be configured to be capable of guiding each of the parts with high accuracy.

An FPC 34 (flexible printed circuit) that is a current-carrying section which supplies a power and reads a signal is connected with the electromagnetic coils 23 and 32. The current supplied from the FPC 34 is flowed to the Y electromagnetic coil 23, and a driving force is generated by a relation between the magnetic flux and the current. The flow direction of the current flowed to the Y electromagnetic coil 23 is inversed so that the drive direction is movable in a plus and minus direction of the yaw direction along the Y guide bar 25 on condition that the optical axis is positioned at a center.

A moving position control in the yaw direction is performed via a Y hall element 35 which is mounted on the FPC 34 and is positioned inside the Y electromagnetic coil 23. The magnetic flux change by the N/S poles of the Y magnet 21 is electrically converted by the Y hall element 35 and the change of the electricity is detected by a lens system described below through the FPC 34.

Similarly, the current supplied from the FPC 34 is flowed to the P electromagnetic coil 32 to generate a driving force. The flow direction of the current flowed to the P electromagnetic coil 32 is inversed so that the drive direction is movable in a plus and minus direction of the pitch direction along the P guide bar 30 on condition that the optical axis is positioned at a center.

A moving position control in the pitch direction is performed via a P hall element 36 which is mounted on the FPC 34 and is positioned inside the P electromagnetic coil 32. The magnetic flux change by the N/S poles of the P magnet 28 is electrically converted by the P hall element 36 and the change of the electricity is detected by a lens system described below through the FPC 34.

Although the drive in the yaw direction is performed by moving the third group barrel 3 along a guide, the drive in the pitch direction is performed by simultaneously moving the Y guide base 24 along with the third group barrel 3 due to the configuration of the guide bars and the guides of the U-shaped groove portions in the yaw and pitch directions. Therefore, in the present embodiment, since weights of the parts that drive in the pitch direction is heavy, the current flowing in the pitch direction is larger than that flowing in the yaw direction to enlarge a generated driving force.

In the present embodiment, although the configuration which generates a driving force difference as described above is adopted, for example current-carrying amounts to the coils in the pitch and yaw directions may be set to be equal to each other and the shapes of the coil or the magnet may be changed to provide the driving force difference. Further, if a desired performance can be obtained, each of the current-carrying amounts and the actuator shapes may be equal regardless of the weights of movable parts.

The Y guide bar 25 that is a guide section is overlapped with a projection region onto a plane orthogonal to the optical axis of the Y electromagnetic coil 23 and the Y magnet 21. Similarly, the P guide bar 30 is overlapped with a projection region onto a plane orthogonal to the optical axis of the P electromagnetic coil 32 and the P magnet 28. Further, as shown in FIGS. 6 and 7B, the FPC 34 is overlapped with a projection region onto a plane orthogonal to the optical axis of the electromagnetic coils 23 and 32 and the magnets 21 and 28.

In the present embodiment, in both the pitch and yaw directions, a magnetic circuit is configured to be closed only in one direction of a magnet, i.e. in order of a yoke, a magnet, and a coil, with respect to the third lens group L3. However, in addition, a yoke is attached outside the coil so as to constitute a closed magnetic circuit using the magnet and the two yokes to be configured to obtain a desired driving property or prevent a magnetic interference to another actuator. In such a configuration, a magnet can also be disposed in a movable lens group and a yoke in a fixed lens group to generate an adsorption force in a rotational direction around the guide bar between them to apply a bias by the U-shaped portion using the adsorption force.

Figure 9:
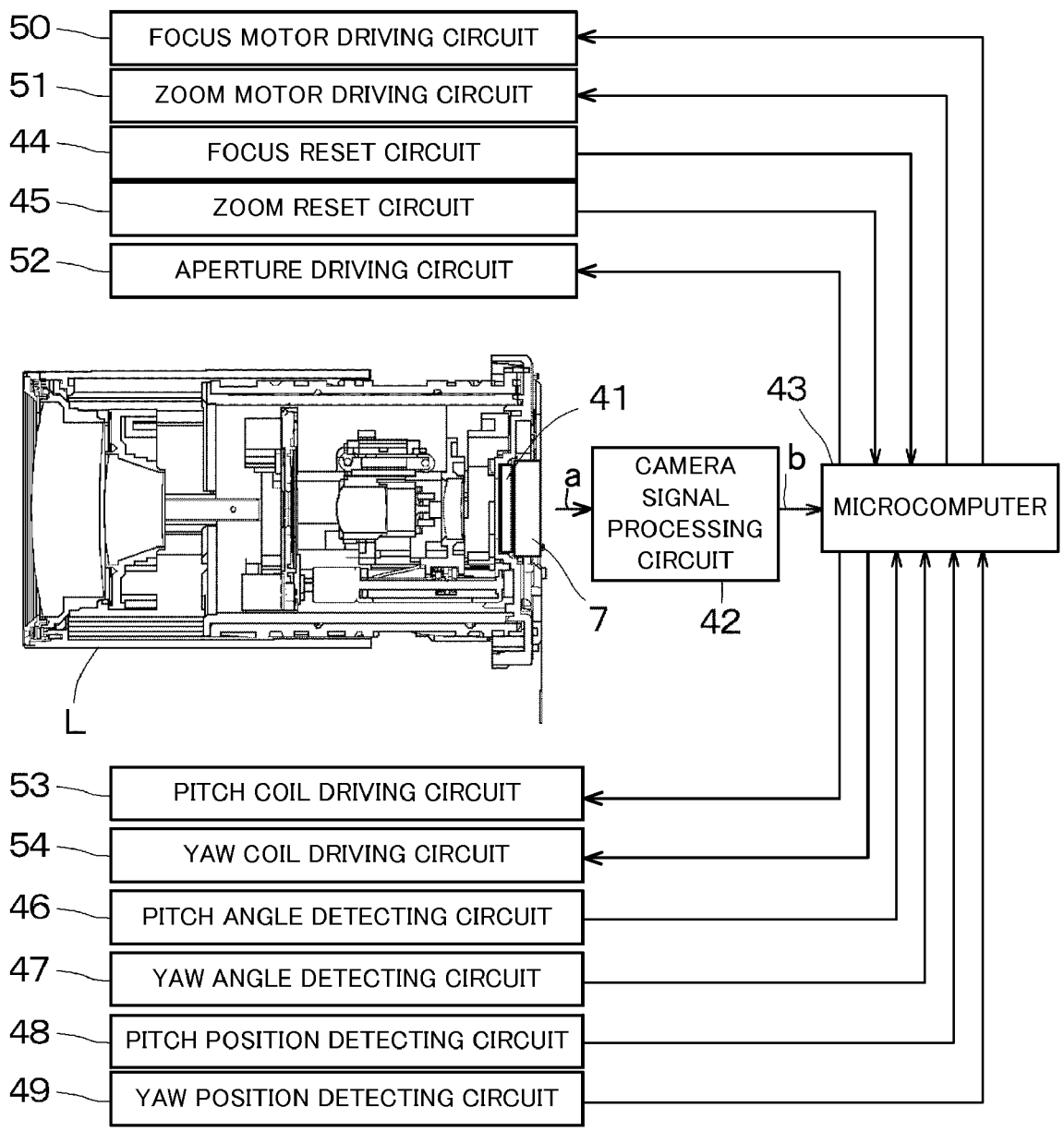
FIG. 9 is a view of a block circuit configuration of an image pickup apparatus.

FIG. 9 is a block circuit configuration diagram of an image pickup apparatus which has a shake correcting function. The lens barrel L is provided with an optical low-pass filter 41 for removing a high-pass component of a spatial frequency of an object and an image pickup element 7 for converting an optical image disposed on a focus plane into an electric signal. An output of the image pickup element 7 is connected with a microcomputer 43 as a control circuit which controls to drive a lens via a camera signal processing circuit 42 which performs processing to output a video signal.

Outputs of a focus reset circuit 44, a zoom reset circuit 45, a pitch angle detecting circuit 46, a yaw angle detecting circuit 47, a pitch position detecting circuit 48, and a yaw position detecting circuit 49 are connected with the microcomputer 43. Outputs of the microcomputer 43 are connected with a focus motor driving circuit 50, a zoom motor driving circuit 51, an aperture driving circuit 52, a pitch coil driving circuit 53, and a yaw coil driving circuit 54, respectively.

When a power supply is turned on, the microcomputer 43 controls the focus motor driving circuit 50 and the zoom motor driving circuit 51 so as to rotate respective stepping motors to move respective moving lens groups in the optical axis direction while monitoring the outputs of the focus reset circuit 44 and the zoom reset circuit 45.

The outputs of the focus reset circuit 44 and the zoom reset circuit 45 are inversed when respective movable members reach predetermined positions, i.e. a shielding member provided on the movable member shields a light emitting section of a photo interrupter provided on a fixed section or reaches a boundary section which is a boundary of transmitting the light. With reference to the position, the number of driving steps of a stepping motor is counted by the microcomputer 43 to be able to obtain an absolute position of each movable lens group.

Thus, focus distance information is precisely obtained, and a series of operations are referred to as a zoom and focus reset operation. The aperture driving circuit 52 drives an aperture shutter unit and an opening diameter of the aperture is controlled based on brightness information b of a video signal inputted to the microcomputer 43. The angle detecting circuits 46 and 47 detect a pitch and a yaw of the image pickup apparatus respectively, and the detection of the angle is for example performed by integrating an output of an angle velocity sensor such as a vibration jyro which is fixed on the image pickup apparatus. The outputs of the angle detecting circuits 46 and 47, i.e. information of a tilt angle of the image pickup apparatus, are inputted to the microcomputer 43.

In order to perform a shake correction, the coil driving circuits 53 and 54 move the third lens group L3 in a direction orthogonal to the pitch and yaw directions with respect to the optical axis. The configuration of a so-called moving coil where a coil is disposed at a gap of a magnetic circuit containing a magnet generates a driving force which shifts the third lens group L3. The position detecting circuits 48 and 49 detect shift amounts of the pitch and the yaw with respect to the optical axis of the third lens group L3 to be inputted to the microcomputer 43.

When the third lens group L3 moves in an orthogonal direction with respect to the optical axis, a passing light beam is bent and a position of an object image which is imaged on the image pickup element 7 is moved. When the image pickup apparatus is really tilted, the microcomputer 43 performs a control so as to move at the same distance opposite to a direction of moving the image to be able to achieve a so-called shake correction by which the image does not move even if the image pickup apparatus shakes.

The microcomputer 43 subtracts a tilt signal of the image pickup apparatus obtained by the pitch angle detecting circuit 46 and the yaw angle detecting circuit 47 and a shift amount signal of the third lens group L3 obtained from the pitch position detecting circuit 48 and the yaw position detecting circuit 49. The third lens group L3 is driven by the pitch coil driving circuit 53 and the yaw coil driving circuit 54 using the signal obtained by amplifying each difference signal and by performing appropriate phase compensation. Thus, a positioning control is performed so that the above difference signal is reduced and therefore the third lens group L3 is maintained at a target position.

In addition, in the present embodiment, since the first to third lens groups L1 to L3 are relatively moved to perform a magnification varying operation, a moving amount of an image with respect to a shift amount of the third lens group L3 changes in accordance with a focus distance. The shift amount of the third lens group L3 cannot be determined by using the tilt signal obtained by the pitch angle detecting circuit 46 and the yaw angle detecting circuit 47 as it is, and the image displacement caused by the tilt of the image pickup apparatus is compensated by the shift of the third lens group L3 by performing a correction based on the focus distance information.

According to the image shake correction apparatus of the present invention, a guide section and a current-carrying section of a holding frame which holds a correction optical system performing a hand-shake correction is disposed at a projection region orthogonal to an optical axis of a magnet and an electromagnetic coil to reduce the size of the apparatus and to improve the assembly productivity.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2009-097065, filed on Apr. 13, 2009, which is hereby incorporated by reference herein in its entirety.

What is claimed is:

1. A lens barrel comprising:
   a lens holding member;
   a fixing member configured to perform a positioning of the lens holding member in an optical axis direction;
   a driving member including a coil fixed on the lens holding member and a magnet fixed on the fixing member; and
   a guide bar configured to guide the lens holding member which is driven by an electromagnetic force acting between the coil and the magnet in a plane orthogonal to the optical axis,
   wherein each of the coil and the magnet is a plate member whose longitudinal is in the optical axis direction,
   the coil is disposed so as to be overlapped with the magnet when viewed in a direction orthogonal to the optical axis,
   the guide bar is disposed so as to be overlapped with both of the coil and the magnet when viewed in the optical axis direction, and
   the lens barrel includes a flexible printed circuit configured to supply current to the coil fixed on the lens holding member, the flexible printed circuit being disposed so as to be overlapped with the both of the coil and the magnet when viewed in the optical axis direction.

2. An image pickup apparatus comprising:
   a lens barrel; and
   a camera including an image pickup element,
   wherein the lens barrel comprises:
   a lens holding member;
   a fixing member configured to perform a positioning of the lens holding member in an optical axis direction;
   a driving member including a coil fixed on the fixing member and a magnet fixed on the lens holding member; and
   a guide bar configured to guide the lens holding member which is driven by an electromagnetic force acting between the coil and the magnet in a plane orthogonal to the optical axis, and
   wherein each of the coil and the magnet is a plate member whose longitudinal is in the optical axis direction,
   the coil is disposed so as to be overlapped with the magnet when viewed in a direction orthogonal to the optical axis,
   the guide bar is disposed so as to be overlapped with both of the coil and the magnet when viewed in the optical axis direction, and
   the lens barrel includes a flexible printed circuit configured to supply current to the coil fixed on the lens holding member, the flexible printed circuit being disposed so as to be overlapped with the both of the coil and the magnet when viewed in the optical axis direction.

* * * * *